United States Patent

Clatanoff et al.

[11] Patent Number: 5,519,451
[45] Date of Patent: May 21, 1996

[54] MOTION ADAPTIVE SCAN-RATE CONVERSION USING DIRECTIONAL EDGE INTERPOLATION

[75] Inventors: Todd Clatanoff; Vishal Markandey, both of Dallas; Robert J. Gove; Kazuhiro Ohara, both of Plano, all of Tex.

[73] Assignee: Texas Instruments Incorporated, Dallas, Tex.

[21] Appl. No.: 227,816

[22] Filed: Apr. 14, 1994

[51] Int. Cl.$^6$ .................................................. H04N 7/01
[52] U.S. Cl. ........................ 348/606; 348/625; 348/627; 348/446
[58] Field of Search .................................. 348/625, 627, 348/606, 431, 450, 451, 409, 452, 427, 446, 392, 699, 700, 701; 382/22, 23; 364/715.01, 724.011; H04N 7/01, 5/14, 9/64, 11/20, 5/21, 5/213, 5/217

[56] References Cited

U.S. PATENT DOCUMENTS 5,051,826  9/1991  Ishii et al. .............................. 348/700
5,387,947  2/1995  Shin ........................................ 348/699

FOREIGN PATENT DOCUMENTS

622953A1  11/1994  European Pat. Off. ......... H04N 5/14
2175770   3/1986   United Kingdom ............. H04N 7/10

OTHER PUBLICATIONS

Doyle, Interlaced to Sequential Conversion for DETV Applications, 29 Feb.–Mar. 1988, pp. 423–427.

*Primary Examiner*—James J. Groody
*Assistant Examiner*—Nina N. West
*Attorney, Agent, or Firm*—Julie L. Reed; James C. Kesterson; John D. Kaufmann

[57] ABSTRACT

A method for processing video data to produce a progressively scanned signal from an input of conventional interlaced video. The data is received at a processor (1), used to determine a motion signal (26) over time between field of the data. The motion signal is filtered to reduce errors caused by noise-corrupted video sources and then further filtered to spread out the determined motion signal. Edge information (30) is located and combined with the motion signal to produce an integrated progressive-scan signal (36) for display on a video display device, producing images with sharper edges and motion signals which have a lower susceptibility to noise.

5 Claims, 3 Drawing Sheets

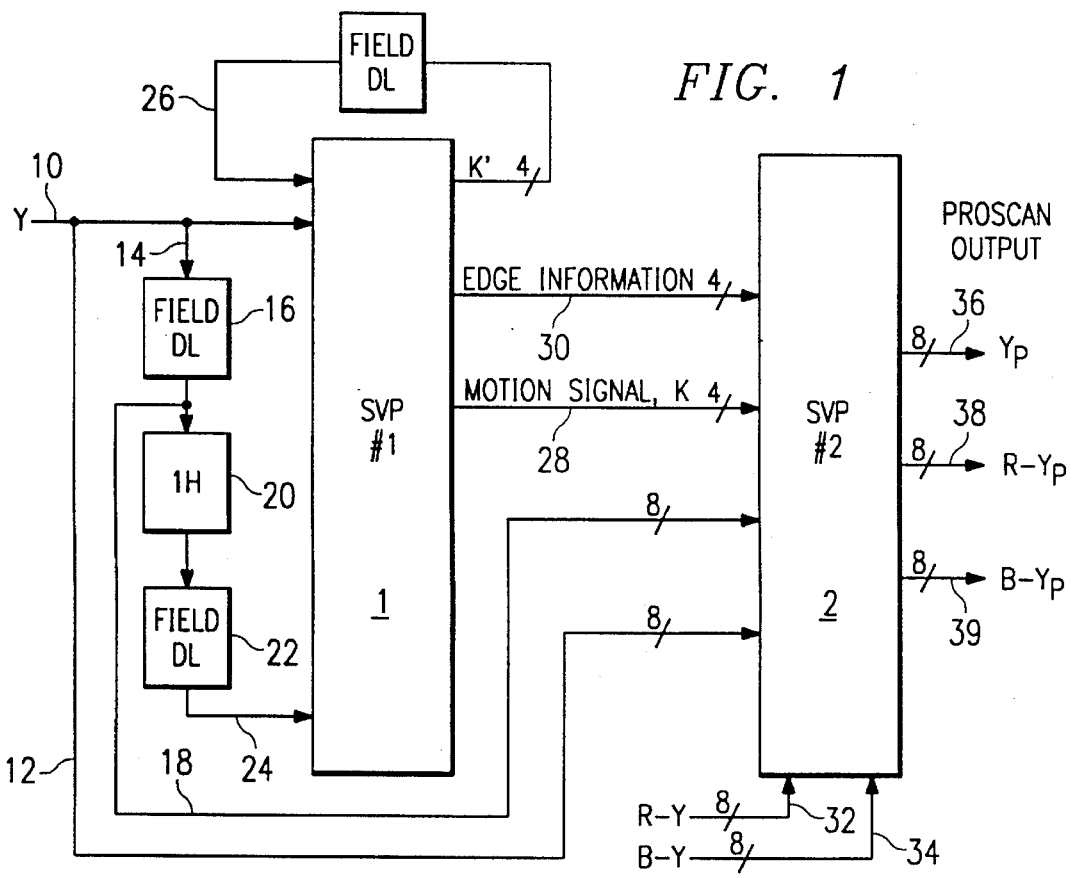
FIG. 1
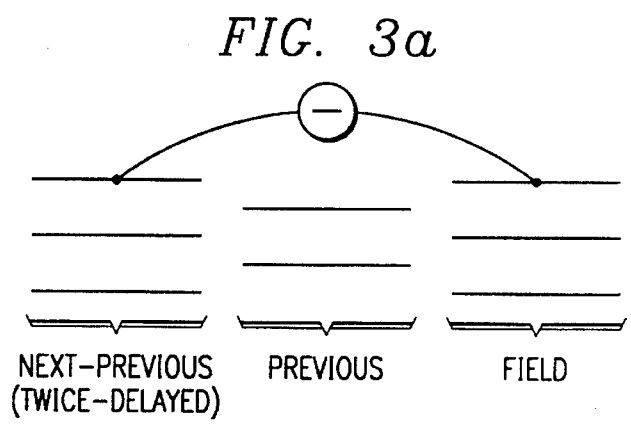
FIG. 3a
FIG. 3b
FIG. 5
DIFFERENCES: $AF = |A-F|$  $CE = |C-E|$
$BE = |B-E|$  $AE = |A-E|$
$CD = |C-D|$
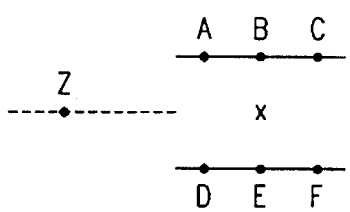

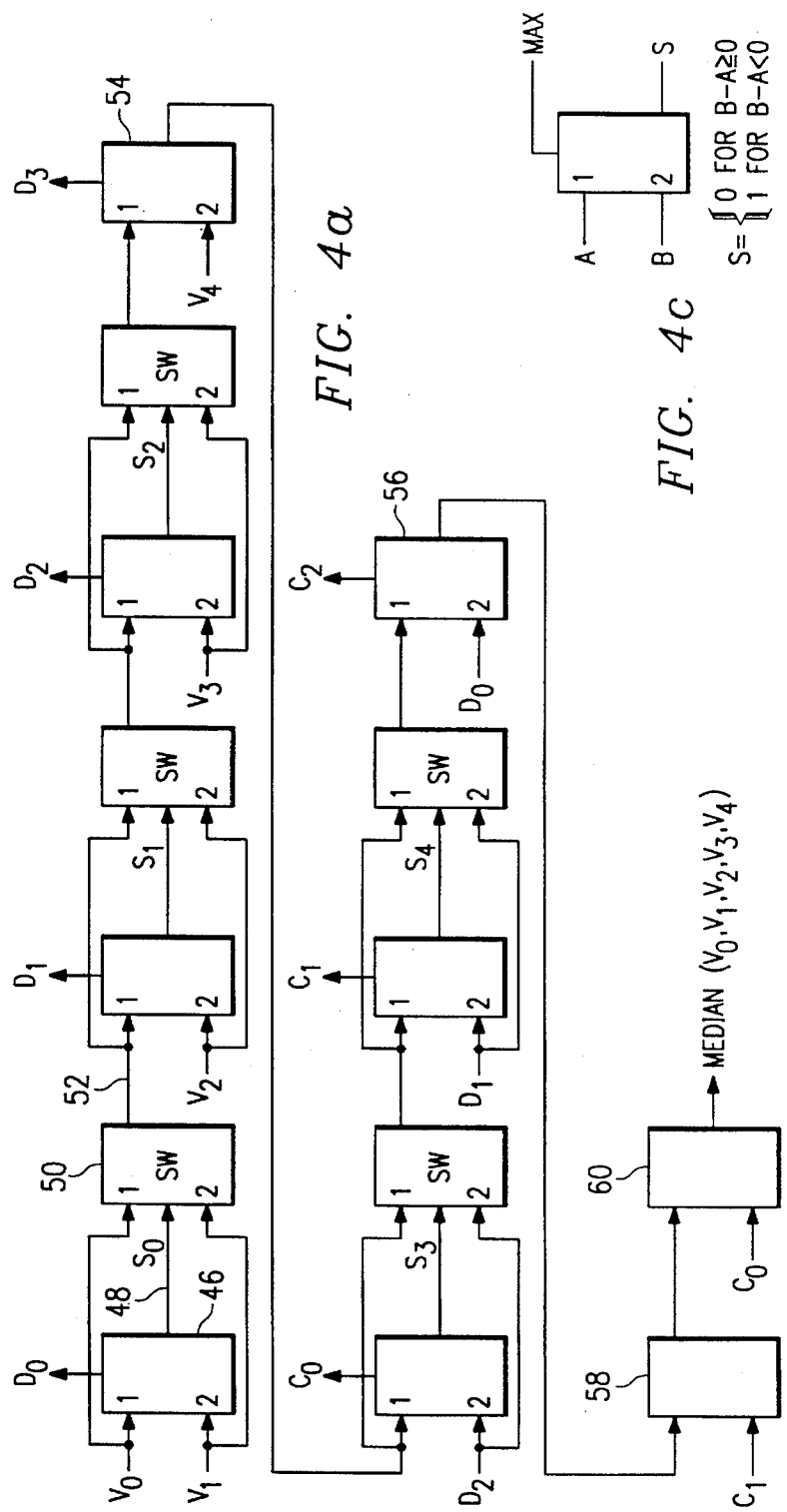
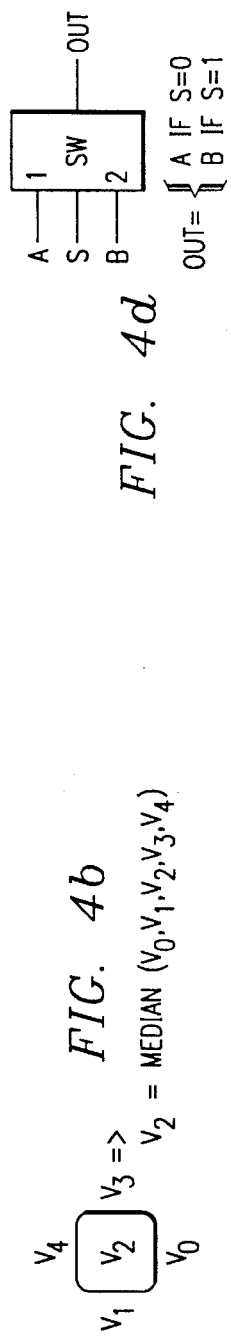

5,519,451

MOTION ADAPTIVE SCAN-RATE CONVERSION USING DIRECTIONAL EDGE INTERPOLATION

BACKGROUND OF THE INVENTION

1. Field of the Invention

This invention relates to digital video systems, more particularly to the display of motion video sequences on digital display systems.

2. Background of the Invention

As television moves from an analog system to a digital system, several problems arise. One such problem occurs in the depiction of moving objects across the field of display.

When an object moves across the display in an analog system, the edges, or the object boundaries, remain true to life, with no real difficulties in portraying curves, diagonals and other features of the objects in motion. One example of an edge would be the curve of a red ball against a blue background. However, in a pixelated display with individual cells instead of lines of continuous images, the edge integrity becomes harder to maintain.

An additional problem is that most conventional televisions use an interlaced format, where the display device draws every other line during one interval, then draws the missing lines in the second interval. In a digital television using such techniques as progressive scan, where every line is "drawn" during the same interval, the missing data from the second interval must be interpolated. Interpolation of moving objects creates artifacts, or visual images that have errors in them.

Rounded edges on an object such as a ball present no real problems when stationary. The curves smooth out through the use of prior field data of the stationary object. Without the use of prior field data, a curve would have a jagged edge, looking much like a stair step or serrated edge. When the object moves, however, previous field data can no longer be used due to the lack of correlation between the present field and the past field. Hence, line averaging techniques using the current field are often employed for the interpolation process. Simple line averaging techniques suffer from a lack of perceived resolution which is evidenced by blurring and serrated edges. These visual artifacts are due to an interpolation process that does not take into consideration the actual edge content of the data.

The adaptive techniques used have been unsatisfactory in resolving moving edges. The resulting picture has artifacts such as the serrated edges mentioned above, that detract from the advantages of high-definition television (HDTV) or the generally sharper picture possible in digital televisions.

Some method is needed that allows the display to portray moving edges in keeping with the clarity and sharpness available in digital television, that also is usable in the higher speed environment of progressive scan without a huge increase in the processing requirements.

SUMMARY OF THE INVENTION

An interlaced-to-progressive-scan conversion process is disclosed herein. The process employs motion-compensated interpolation. It performs motion detection with the use of median-filtered inter-frame difference signals and uses a fast median filtering procedure. The process is edge adaptive, using edge orientations from the original interlace picture. The process provides for motion detection that has a low susceptibility to noise, while also providing for an adaptive interpolation process which preserves the integrity of edges found in the original interlaced picture. The process results in a picture with sharper moving edges and lower noise, overall resulting in a better scene presentation for the viewer.

BRIEF DESCRIPTION OF THE DRAWINGS

For a more complete understanding of the present invention and for further advantages thereof, reference is now made to the following Detailed Description taken in conjunction with the accompanying Drawings in which:

FIG. 1 shows a flow chart of a motion adaptive interlace-to-progressive-scan conversion.

FIGS. 3a–b show graphical examples of a process to determine a motion signal.

FIG. 4a–d show graphical representation of a fast median filtering process.

FIG. 5 shows a graphical example of edge detection.

DETAILED DESCRIPTION OF THE PREFERRED EMBODIMENTS

Figure 2:
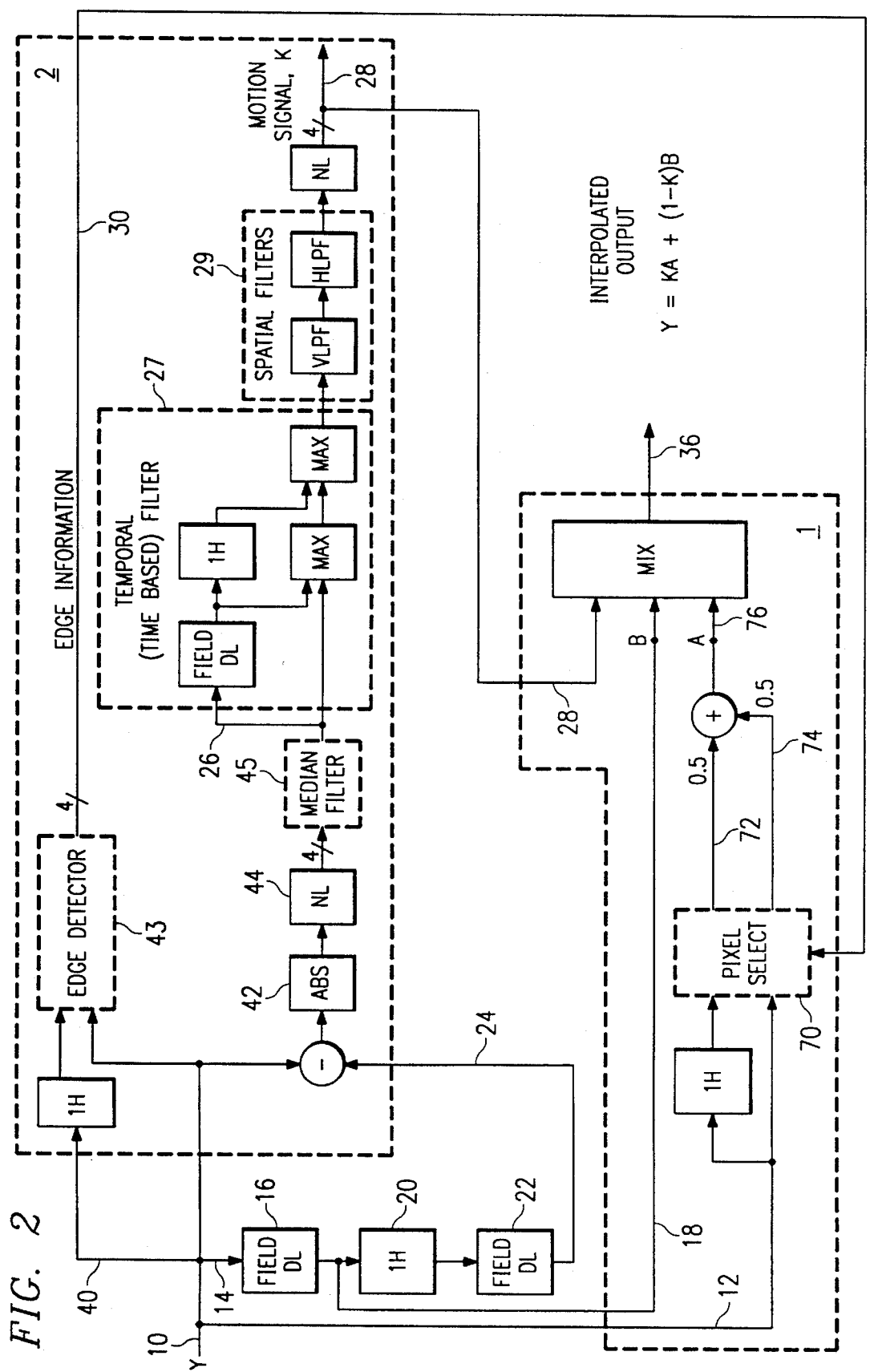
FIG. 2 shows an exploded view of a flow chart of a motion adaptive interlace-to-progressive-scan conversion with a more detailed description of the process of generating motion and edge detection signals.

Motion adaptive interlaced-to-progressive-scan conversion (IPC) is used to eliminate artifacts attributed to the interlaced scanning format, where each field contains every other line and the two are interlaced into a complete frame. IPC techniques use the weighted sum of a motion signal, k, along with inter- and intra-field values.

One example of an IPC method is shown in FIG. 1. In FIG. 1, the discussion is to merely point out what signals travel where and at what times. The functionality of the signals and the purposes behind the delays will be discussed in FIG. 2.

The luminance signal, Y travels to Scan-line Video Processor (SVP) #1 along path 10. The same signal is passed unchanged to SVP #2, along path 12. Path 14 takes Y and delays it one field at 'Field DL' 16. This delayed field is passed directly to SVP #2 along path 18. Before travelling to SVP #1, however, the already-once-delayed signal goes through a one-line horizontal delay at '1H' 20, and another field delay at 'Field DL' 22. The twice-delayed signal now travels to SVP #1 along path 24.

SVP #1 produces three signals. The first signal is k' at line 26. It is delayed one field and reprocessed to aid in the production of the motion signal k at line 28. The edge information exits SVP #1 on line 30 and enters SVP #2. SVP #2 has the following inputs: the original luminance signal Y on line 12, a once-delayed Y signal on line 18, a motion signal k on line 28, an edge information signal on line 30; and two color difference signals, R-Y and B-Y on lines 32 and 34, respectively. SVP #2 has output signals $Y_p$, for luminance proscan on line 36, and color difference signals $R-Y_p$ and $B-Y_p$ on line 38.

It must be understood that, if the SVP is big enough and fast enough, the processes performed in SVP #2 could possibly be performed in a different section of SVP #1. However, for ease of discussion, it is more understandable to use two SVPs. Additionally, the type of processor used does not have to be a SVP at all. It is possible that other processors could be adapted to operate in substantially the same manner as needed to implement these algorithms.

Motion Signal Processing

Looking at the various signals and their function in producing the proscan output $Y_p$, turn now to FIG. 2. FIG. 2 shows a more detailed schematic of the internal processes of each SVP. The area enclosed in the upper dashed-line box is SVP #1 from FIG. 1. The original Y signal again resides on line 10. As it enters SVP #1, lines 14 and 40 tap off of it. Line 14 delays the signal for one field at 'Field DL' 16 because of the manner in which motion is detected. In order to determine the magnitude of motion, a comparison must be made between the current field and the twice-delayed field. This once-delayed luminance field is then passed to SVP #2 along path 18. Path 14 continues to '1H' delay 20 to prevent any odd/even line mismatch between the delayed fields. It delays the field one horizontal line. The field is then delayed again at 'Field DL' 22. This twice-delayed field passes along path 24. The current field entering the system on path 10 then subtracts the twice-delayed field on path 24, giving a comparison value of the two fields.

A graphical representation of this motion signal determination is shown in FIGS. 3a and 3b. The field difference is found by comparing the current field with the twice-delayed field at the difference sign in FIG. 3a. The interpolated pixel X is determined using the motion signal k, in conjunction with the spatial neighbor pixels of X, as well as pixel Z from the previous field, in FIG. 3b. This diagram brings together the concepts of edge information and the motion signal which will be discussed further in reference to FIG. 5.

Because the comparison value is a signed number, it has nine bits. By taking the absolute value of the value at 'ABS' 42, this is reduced to an eight-bit number. The nonlinear function 'NL' 44 then reduces the eight bits to four for passage into the median filter 45.

The median filtering process is shown in FIG. 4a. By median filtering the motion signal, any point noise sources can be eliminated, thus adding reliability to the motion signal. To find the lowest noise target data, the median filter uses the values of neighboring data points to find the target data as shown in FIG. 4a.

The median filtering technique used merely as a specific example of this process represents a fast and efficient method of performing a 5-tap median calculation. Fast and efficient processes are necessary for many digital-signal-processing (DSP) applications where execution time and program instruction space are at a premium. Real-time implementations, such as this process, place an even higher price on execution time and instruction space.

The 5-tap median filter process used in this procedure requires a total of 181 instructions, where a more conventional approach requires approximately 277 instructions out of a possible 910 instructions in the current configuration of scanline video processors, such as SVP #1. The use of this fast median filter algorithm represents an approximate 35% savings in instruction space compared to the conventional algorithm.

The conventional approach to performing a 5-tap median filter involves either of the following:

MED(a,b,c,d,e)=MAX[min(a,b,c), min(a,b,d), min(a,b,e), min(a,c,d), min(a,c,e), min(a,d,e), min(b,c,d), min(b,c,e), min(b,d,e), min(c,d,e)]

or

MED(a,b,c,d,e)=MIN[max(a,b,c), max(a,b,d), max(a,b, e), max(a,c,d), max(a,c,e), max(a,d,e), max(b,c,d), max(b,c,e), max(b,d, e), max(c,d,e)].

In general, for an L-element sequence, the conventional method involves taking the minimum or maximum of the maximum or minimum of $$\frac{L!}{\left(\frac{L+1}{2}\right)!\left(\frac{L-1}{2}\right)!}$$

subsequences. This factorial expression implies that as the length of the L-element sequence increases, the complexity increases in a factorial manner. Conversely, the complexity of the present fast median filter increases in a linear manner as the length of the L-element sequence increases. Therefore, higher complexity median filter implementations could be achieved using the instant median filter process, while keeping the execution time and instruction space at a minimum.

Variables $V_0$, $V_1$, $V_2$, $V_3$, and $V_4$ represent the data points surrounding and including the point being interpolated, as shown in FIG. 4b. Two of the given values are compared and the extreme of these is removed in step 46. This filtering process can process either the maximum values and use the lowest value for median determination, or it can process the minimum values and use the highest value for median determination. The sought after result is to find the middle value of the five inputs. Rather than restrict the discussion, these maximum or minimum values will be referred to as 'extreme' values. If this were the implementation where the maximum values are processed, step 46 functions as shown in FIG. 4c. If $V_1$ is greater than or equal to $V_0$, then $S_0$ is 0, as shown in FIG. 4d. This means that $V_0$ is smaller than $V_1$.

This process continues until at step 54, the set of extremes $D_0$ through $D_3$ represent the four highest or lowest values. This set is further reduced to a set of the three highest or lowest values, $C_0$ through $C_2$, by step 56. In steps 58 and 60 the three highest or lowest values are sorted to find the opposite extreme of those three variables. For example if the values $C_0$ through $C_2$ are the largest three values, steps 58 and 60 determine which is the minimum of the three. This then becomes the median value.

The above example is for a 5-tap median filter. More or less taps can be used. At some point, the number of SVP instructions will rise to a point that the extra precision advantage is no longer greater than the number of instructions required. That point must be determined by each designer. However, at this point a 5-tap filter has been determined to be the best compromise between instruction count and precision obtained.

Returning now to FIGS. 1 and 2, the output of the median filter on line 26 is then sent in a feedback loop as signal k' as shown on the same line in FIG. 1. Signal k' is the motion signal used as an input to the temporal filter. The remaining processing done on motion signal k' is shown in more detail in FIG. 2. Dashed line 27 represents the processes done on motion signal k' from line 26. This step temporally filters the signal by using a series of field delay lines 'FIELD DL' and horizontal delay '1IH' in conjunction with the values determined from the median filtering process.

Dashed line 29 encompasses the spatial filtering performed after the temporal filtering. The spatial filtering step comprises a vertical low pass filter 'VLPF' and a horizontal low pass filter 'HLPF' both of which serve to spread out the motion in the final motion signal, k, which is output from SVP #1 on line 28.

The temporal filter 27 and the spatial filter 29 have a tendency to spread the motion signal outward in a spatial manner. Therefore, any noise or errors in that signal tend to propagate. The heretofore unknown advantage of using the median filter before these filters is that the median filter eliminates the noise and prevents its propagation to the neighboring pixels, resulting in a much clearer picture.

Another problem that was previously mentioned is the detection of edges in conjunction with motion. While edge detection and motion signal processing are two separate topics and can be implemented separately, edge information really only takes effect in the presence of motion. Therefore the motion signal processing can influence the amount of edge information used for interpolation of the missing lines.

Edge Detection

Referring back now to FIGS. 1 and 2, the discussion moves to the edge information output on line 30 in FIG. 1. A more detailed diagram of the process is shown in FIG. 2. The edge detector 43 uses the inputs of line 10, the original luminance signal, and the luminance signal that has been delayed one horizontal line, along path 40. This process is shown graphically in FIG. 5.

Similar to FIG. 3b, the pixel X has neighbors A–F. The direction of the edge could be determined to be any combination of the above neighbors and the below neighbors, not including redundant edge directions. For example, AD, BE, and CF are all vertical edges and do not require more than one designation of direction. Therefore the possible edge directions are AE, AF, BE, CD and CE. Note that AE and BF are the same edge, as are CE and BD. These designation of AF, etc., designate the absolute value of the difference between the two variables. AF is the absolute value of A–F. If the maximum of the 5 values AE, AF, BE, CD, and CE minus the minimum of these values is greater than a predetermined threshold value, then the edge direction is selected to be the minimum of the 5 values. Otherwise, the edge is determined to be BE, or vertical. One way to implement this is to assign each possible edge direction a value that is passed to the second SVP, thereby informing SVP #2 which interpolation to use.

Returning to FIG. 2, this edge information is transmitted on path 30 to SVP #2. There the edge information on path 30 is combined with the original luminance signal, a horizontally line-delayed luminance signal at the 'PIXEL SELECT' step 70. Here the SVP performs a process where it selects one pixel from A, B, or C (see FIG. 3b), and one from D, E, or F. These two pixels will then be used to compute the line average component of the weighted-mean interpolation. The two signals are weighted equally at ½ and combined. This resulting signal is input to the 'MIX' step on line 76, where it is processed with a field-delayed luminance signal from line 18, and the motion signal, k, on line 28. The resulting output on line 36 is the interpolated proscan output signal, $Y_p$.

Additionally, the color difference signals R-Y and B-Y are output from SVP #2 on lines 38 and 39, which are calculated using line average. As was previously mentioned, all of the above could possibly be performed in the same SVP, such as SVP #1. In that case, the edge information and motion signal would be considered to be made available for further processing instead of transmitted to SVP #2.

The above process allows an interlaced signal to be converted to progressive scan, or proscan, with sharper edges and motion. The objects in motion in the scene have cleaner edges, giving a better picture to the viewer. Additionally, these processes can be installed in the scan-line video processors already necessary to the IPC process since the overall process uses a minimum number of instructions that can be implemented in the SVPs' unused portions. It is possible that all of the above steps could be performed in different active areas of one processor.

Thus, although there has been described to this point a particular embodiment for an interlace-to-progressive scan process, it is not intended that such specific references be considered as limitations upon the scope of this invention except in-so-far as set forth in the following claims.

What is claimed is:

1. A system for improved processing of video data, including:
   a. a circuit for receiving said data;
   b. a processor within said circuit operable to:
      i. detect motion and edge signals in said data;
      ii. filter said motion signal to reduce noise, wherein said filtering is performed by a fast median filter;
      iii. spread said data through the use of temporal and spatial filters;
      iv. reduce serrations along moving edges through the use of an edge correlator for directional interpolation; and
      v. use said filtered motion signal and said edge signals to produce a progressive-scan signal; and
   c. a display device for receiving and displaying said signal.

2. A method of processing video data, comprising:
   a. receiving said data into a processor;
   b. determining a motion signal from said data;
   c. finding edge information in said data;
   d. filtering said motion signal;
   e. passing said edge information and said filtered motion signal to a video processor; and
   f. using said filtered motion signal and said edge information to produce a progressive-scan signal for use on a video display device.

3. The system as in claim 1 wherein said fast median filter is a 5-tap median filter.

4. The system as in claim 1 wherein said temporal filter uses said motion signal.

5. The system as in claim 1 wherein said spatial filter comprises a vertical low pass filter and a horizontal low pass filter.

* * * * *